United States Patent
Shao et al.

(10) Patent No.: US 12,302,316 B2
(45) Date of Patent: May 13, 2025

(54) INDICATION METHOD AND APPARATUS, UPLINK TRANSMISSION METHOD AND APPARATUS, SERVING NODE, TERMINAL AND MEDIUM

(71) Applicant: ZTE CORPORATION, Shenzhen (CN)

(72) Inventors: Shijia Shao, Shenzhen (CN); Chuangxin Jiang, Shenzhen (CN); Huahua Xiao, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 394 days.

(21) Appl. No.: 17/759,743

(22) PCT Filed: Apr. 20, 2021

(86) PCT No.: PCT/CN2021/088310
§ 371 (c)(1),
(2) Date: Jul. 29, 2022

(87) PCT Pub. No.: WO2021/213364
PCT Pub. Date: Oct. 28, 2021

(65) Prior Publication Data
US 2023/0066850 A1    Mar. 2, 2023

(30) Foreign Application Priority Data
Apr. 21, 2020   (CN) .......................... 202010317957.4

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2017/0273030 A1* | 9/2017 | Noh | .................. H04W 52/146 |
| 2020/0022137 A1 | 1/2020 | Xiao et al. | |

(Continued)

FOREIGN PATENT DOCUMENTS

| | | |
|---|---|---|
| CN | 108809610 A | 11/2018 |
| CN | 109076467 A | 12/2018 |

(Continued)

OTHER PUBLICATIONS

European Patent Office. Extended European Search Report for EP Application No. 21793679.8, mailed Apr. 10, 2024, pp. 1-9.

(Continued)

*Primary Examiner* — Phirin Sam
(74) *Attorney, Agent, or Firm* — Vivacqua Crane, PLLC

(57) ABSTRACT

Provided are an indication method and apparatus, an uplink transmission method and apparatus, a serving node, a terminal device and a non-transitory computer-readable storage medium. The indication method is applicable to a serving node, and may includes transmitting indication information configured to indicate a resource configuration for uplink transmission, and receiving uplink control information transmitted by a terminal device.

18 Claims, 5 Drawing Sheets

(56) References Cited

U.S. PATENT DOCUMENTS

| | | | |
|---|---|---|---|
| 2020/0077342 A1 | 3/2020 | Akkarakaran et al. | |
| 2020/0120692 A1* | 4/2020 | Park | H04W 72/0446 |
| 2020/0137743 A1* | 4/2020 | Yang | H04B 1/713 |
| 2020/0213031 A1* | 7/2020 | Gao | H04L 5/0053 |
| 2020/0221448 A1* | 7/2020 | Park | H04W 80/08 |
| 2021/0050955 A1* | 2/2021 | Park | H04B 7/0456 |
| 2021/0105751 A1* | 4/2021 | Xu | H04B 7/088 |
| 2021/0219298 A1* | 7/2021 | Xue | H04L 1/1671 |
| 2022/0124780 A1* | 4/2022 | Lei | H04L 1/1893 |
| 2022/0239411 A1* | 7/2022 | Taherzadeh Boroujeni | H04W 72/20 |
| 2022/0322312 A1 | 10/2022 | Liu et al. | |
| 2023/0025287 A1* | 1/2023 | Choi | H04W 72/0453 |
| 2025/0063593 A1* | 2/2025 | Taherzadeh Boroujeni | H04W 72/1263 |

FOREIGN PATENT DOCUMENTS

| | | |
|---|---|---|
| CN | 110226315 A | 9/2019 |
| CN | 110536404 A | 12/2019 |
| CN | 111901875 A | 11/2020 |
| WO | 2018227148 A1 | 12/2018 |
| WO | 2020034442 A1 | 2/2020 |
| WO | 2021260658 A1 | 12/2021 |

OTHER PUBLICATIONS

3GPP Technical Specification Group Radio Access Network. "Enhancements on multi-TRP/panel transmission," 3GPP TSG-RAN WG1 #97 Meeting, May 13-17, 2019, pp. 1-32.

3GPP Technical Specification Group Radio Access Network. "RAN1 agreements for Rel-16 eURLLC," 3GPP TSG-RAN WG1 Meeting #98, Aug. 26-30, 2019, pp. 1-21.

International Searching Authority. International Search Report and Written Opinion for PCT Application No. PCT/CN2021/088310 and English translation, mailed Jul. 21, 2021, pp. 1-13.

3GPP Technical Specification Group Radio Access Network. "Summary for AI 7.1.6.1 NR UL power control in non-CA aspects," 3GPP TSG RAN WG1 Meeting #93, R1-1807653, May 2018, pp. 1-27.

The State Intellectual Property Office of People's Republic of China. First Office Action for CN Application No. 202010317957.4 and English translation, mailed Jan. 23, 2025, pp. 1-12.

The State Intellectual Property Office of People's Republic of China. First Search Report for CN Application No. 202010317957.4 and English translation, mailed Jan. 20, 2025, pp. 1-6.

* cited by examiner

INDICATION METHOD AND APPARATUS, UPLINK TRANSMISSION METHOD AND APPARATUS, SERVING NODE, TERMINAL AND MEDIUM

CROSS REFERENCE TO RELATED APPLICATIONS

This application is a national stage filing under 35 U.S.C. § 371 of international application number PCT/CN2021/088310, filed Apr. 20, 2021, which claims priority to Chinese patent application No. 202010317957.4, filed Apr. 21, 2020. The contents of these applications are incorporated herein by reference in their entirety.

TECHNICAL FIELD

The present disclosure relates to a wireless communication network, for example, to an indication method and apparatus, an uplink transmission method and apparatus, a serving node, a terminal device and a non-transitory computer-readable storage medium.

BACKGROUND

In an enhanced mobile broadband (eMBB) scenario, the joint transmission technology based on Multiple Transmission and Reception Points (Multi-TRPs) realizes effective improvements to the data traffic in the Long-Term Evolution (LTE), the Long-Term Evolution-Advanced (LTE-A) and the New Radio Access Technology (NR), and can thus further enhance the user experience. However, in the case of Multi-TRPs, especially in the Ultra-Reliable Low-Latency Communication scenario, there are usually many spatial relations corresponding to different beams and repetitions, which complicates the communication environment and the resource configuration. At present, there are no effective mechanisms for terminal devices to decide how to use uplink transmission resources to transmit uplink transmissions for multi-TRPs and multi-beams, so it is difficult to perform power control, resource allocation or the like for multi-TRPs and multi-beams.

SUMMARY

The present disclosure provides an indication method and apparatus, an uplink transmission method and apparatus, a serving node, a terminal device and a non-transitory computer-readable storage medium. By indicating a resource configuration to a terminal device, the serving node provides a basis for the uplink transmission of the terminal device, thereby improving the reliability of the uplink transmission.

An embodiment of the present disclosure provides an indication method, applied to a serving node. The method includes:

sending indication information, where the indication information is used to indicate a resource configuration for uplink transmission; and receiving Uplink Control Information (UCI) transmitted by a terminal device.

An embodiment of the present disclosure further provides an uplink transmission method, applied to a terminal device. The method includes:

receiving indication information, where the indication information is used to indicate a resource configuration for uplink transmission; and transmitting UCI according to the indication information.

An embodiment of the present disclosure further provides an indication apparatus. The apparatus includes:

an indication module configured to transmit indication information, where the indication information is used to indicate a resource configuration for uplink transmission; and a receiving module configured to receive UCI transmitted by a terminal device.

An embodiment of the present disclosure further provides an uplink transmission apparatus. The apparatus includes:

an indication information receiving module configured to receive indication information, where the indication information is used to indicate a resource configuration for uplink transmission; and an uplink transmission module configured to transmit UCI according to the indication information.

An embodiment of the present disclosure further provides a serving node. The serving node includes:

one or more processors; and a storage device configured to store one or more programs;

where the one or more programs, when executed by the one or more processors, cause the one or more processors to implement the indication method applied to a serving node.

An embodiment of the present disclosure further provides a terminal device. The terminal device includes:

one or more processors; and a storage device configured to store one or more programs;

where the one or more programs, when executed by the one or more processors, cause the one or more processors to implement the uplink transmission method applied to a terminal device.

An embodiment of the present disclosure further provides a non-transitory computer-readable storage medium storing computer programs which, when executed by a processor, cause the processor to implement the indication method or uplink transmission method described above.

DETAILED DESCRIPTION

The present disclosure will be described below by embodiments with reference to the accompanying drawings. It should be understood that the specific embodiments described herein are merely used to illustrate the present disclosure, and are not intended to limit the present disclosure. It is to be noted that the embodiments in the present disclosure and the features in the embodiments may be arbitrarily combined with each other if not conflicted. In addition, it is also to be noted that, for convenience of description, only some but not all of structures related to the present disclosure are shown in the accompanying drawings.

The joint transmission technology based on Multi-TRP allows for an effective improvement of the transmission throughput in the wireless communication system. There is also Multi-Panel transmission in the New Radio (NR) technology, in which the terminal device can perform transmission by multiple antenna panels to achieve higher spectrum efficiency. In addition, the repeated transmissions or receptions using Multi-TRP or Multi-Panel can improve the probability of the receiver acquiring correct information, and effectively improve the transmission reliability in the Ultra-Reliable and Low-Latency Communications (URLLC) scenario. However, since the effective indication of uplink transmission is not perfect, especially when the terminal device supports Multi-Panel, it is difficult for the terminal device to decide how to use uplink transmission resources for uplink transmission. Thus, it is also difficult to perform power control, resource allocation or the like on Multi-Panel, and the uplink transmissions on multiple TRPs interfere with each other, so that the transmission performance is greatly reduced and the reliability of uplink transmission is low.

An embodiment of the present disclosure provides an indication method which is applied to a serving node. The serving node indicates to a terminal device a resource configuration for transmitting uplink transmission by transmitting indication information, thereby providing a basis for the terminal device to transmit UCI by utilizing the corresponding resource, and ensuring the reliability of uplink transmission.

Figure 1:
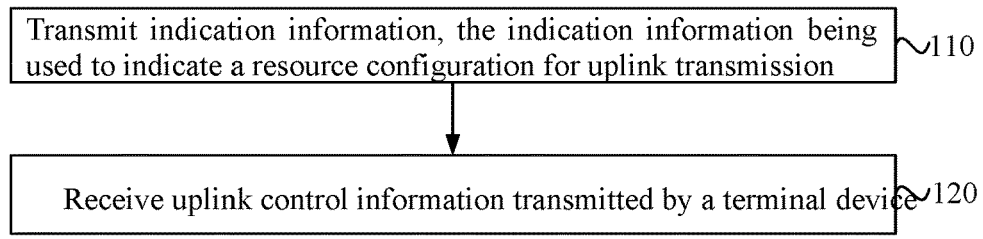
FIG. 1 is a flowchart of an indication method according to an embodiment.

FIG. 1 is a flowchart of an indication method according to an embodiment. As shown in FIG. 1, the method provided in the embodiment includes steps S110 and S120.

At S110, indication information is transmitted, where the indication information is used to indicate a resource configuration for uplink transmission.

At S120, UCI transmitted by a terminal device is received.

In the embodiment, the serving node is, for example, a base station and the terminal device is, for example, a user equipment (UE). The resource configuration may include a resource set available for the terminal device, a resource for transmitting uplink transmission, a spatial relation included in the resource, the number of repetitions of an uplink control channel, a transmission mode for uplink transmission, etc., and is used to indicate the resource used by the terminal device to transmit uplink transmission and a specific transmission mode. The UCI is an uplink transmission signaling transmitted to the serving node by the terminal device, including Channel State Information (CSI), a Hybrid Automatic Repeat Request (HARD), a Scheduling Request, etc., and is mainly transmitted through a Physical Uplink Control Channel (PUCCH). In the embodiment, the terminal device may transmit the UCI to a plurality of TRPs (e.g., a plurality of base stations), and the serving node indicates to the terminal device a plurality of resource configurations, which correspond to paths between the terminal device and the plurality of TRPs, respectively.

In an embodiment, the method further includes a step S101.

At S101, at least one PUCCH resource set is configured for the terminal device through a higher-layer signaling, where each PUCCH resource set contains at least one PUCCH resource; and, at least one spatial relation is activated for each PUCCH resource of the terminal device through a Medium Access Control-Control Element (MAC-CE).

In the embodiment, for the serving node, a plurality of PUCCH resource sets each containing a plurality of PUCCH resources are configured for the UE through a higher layer, and one or more spatial relations are activated for each PUCCH resource through the MAC-CE, so that the terminal device transmits the UCI to the TRP by utilizing the one or more spatial relations in the PUCCH resource indicated by the base station.

In an embodiment, the indication information includes Downlink Control Information (DCI). A PUCCH Resource Indicator (PRI) field in the DCI is used to indicate a target resource, the target resource is an uplink transmission resource used by the terminal device to transmit the UCI, and the target resource contains at least one spatial relation.

In the embodiment, the serving node indicates to the UE the PUCCH resource (i.e., the target resource) used to transmit the UCI by utilizing the PRI field in the DCI, thereby providing a basis for the terminal device to transmit uplink transmission.

In an embodiment, the indication information includes the DCI. An extended Transmission Power Control (TPC) Command Field in the DCI is used to adjust the uplink transmission power of the terminal device to transmit the UCI. The extended TPC command field is used to extend an original TPC indication value range or extend the number of TPC fields. The function of the extended TPC command field is determined according to the number of spatial relations included in the target resource and the number of repetitions of the PUCCH.

In the embodiment, the terminal device may transmit the UCI to identical or different TRPs through one or more beams by utilizing one or more spatial relations included in the target resource. By expanding an original TPC command field in the DCI, the transmission power control of different beams can be realized or the indication value range of the same beam can be increased. Here, the function of the extended TPC command field is to expand the original TPC indication value range or extend the number of TPC fields.

Figure 2:
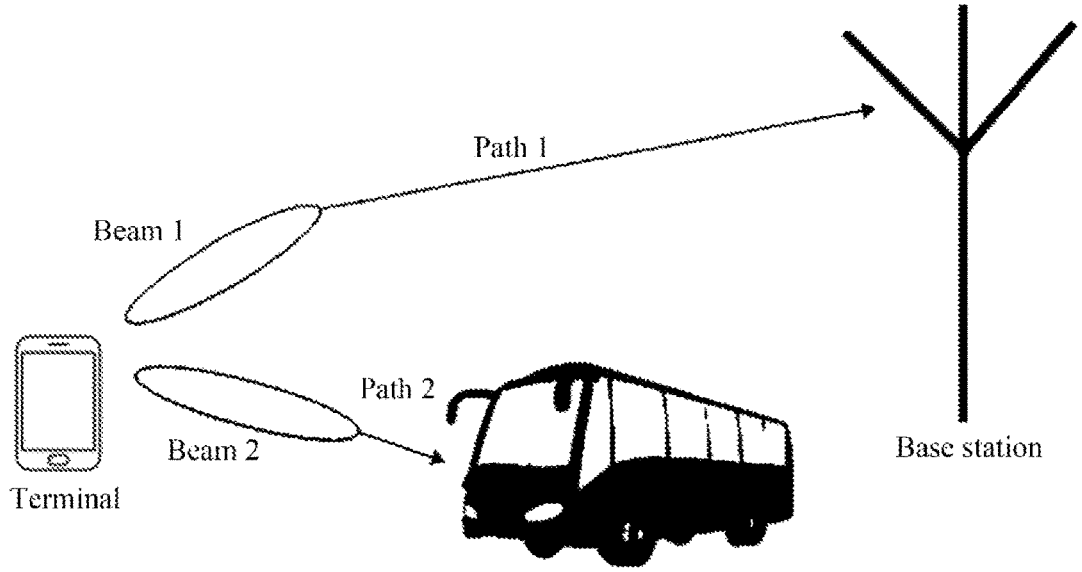
FIG. 2 is a schematic diagram of performing transmission power control on different beams according to an embodiment.

FIG. 2 is a schematic diagram of performing transmission power control on different beams according to an embodiment. As shown in FIG. 2, the base station configures two transmission beams for the UE, i.e., a beam 1 and a beam 2, which correspond to a path 1 and a path 2, respectively. The path 2 is blocked and has a higher loss, so the base station determines that the transmission power of the UE is too low. In contrast, the path 1 has a good transmission condition, so the base station determines that the transmission power of the UE is too high. The original TPC command field in the DCI can only indicate one TPC indication value for fast power adjustment. If the base station indicates a TPC according to the beam 1 to notify the UE to decrease the transmission power by 1 dB, the transmission power is correspondingly decreased by 1 dB during the transmission of the beam 2, leading to deterioration of the transmission performance after the transmission power of the path 2 is decreased. However, if the base station indicates a TPC indication value according to the beam 2 to notify the UE to increase the transmission power by 1 dB, the transmission power is correspondingly increased by 1 dB during the transmission of the beam 1, so that the transmission power corresponding to the beam 1 is too high, or even the transmission of the same time frequency resource is interfered and too much energy is consumed, which is disadvantageous for energy saving.

Table 1 shows a mapping relationship between the original TPC command field and the power control indication value. As shown in Table 1, for the DCI format 1_0, the DCI format 1_1 or the DCI format 2_2, the TPC command field may indicate the following four power control indication values (offset values).

TABLE 1

Mapping relationship between the original TPC command field and the power control indication value

| Original TPC command field | Power control indication value [dB] |
|---|---|
| 0 | −1 |
| 1 | 0 |
| 2 | 1 |
| 3 | 3 |

In the embodiment, the serving node configures a PUCCH resource set for the UE through a higher-layer signaling, activates one or more spatial elations for each PUCCH resource in the PUCCH resource set through the MAC-CE, and indicates a target resource through the PUCCH resource indicator field in the DCI. The original TPC command field in the DCI is extended to obtain an extended TPC command field, so that the original TPC indication value range or the number of TPC command fields is extended, and the uplink transmission power of the terminal device is adjusted with a larger indication value range or a larger number of indicator fields. Thus, during the repetition of the PUCCH, the TPC command may correspond to one or more beams for multiple transmissions, and the flexibility of uplink transmission indication is improved.

For example, in the case of increasing the number of TPC command fields, by taking the UE performing transmission by utilizing beams corresponding to two spatial relations as an example, the number of TPC fields in the DCI is increased to 2, and the number of occupied bits is increased from 2 bits to 4 bits.

Table 2 shows a mapping relationship between the extended TPC command field and the power control indication values for different beams. As shown in FIG. 2, the extended TPC command field occupies 4 bits, where the first 2 bits are used to indicate the TPC indication value of the first beam of the UE and the last 2 bits are used to indicate the TPC indication field corresponding to the second beam of the UE. If the indication field of the extended TPC command field is 0010, it indicates that the transmission power is decreased by 1 dB for the beam 1 while the transmission power is increased by 1 dB for the beam 2.

TABLE 2

Mapping relationship between the extended TPC command field and the power control indication values for different beams

| Extended TPC command field | Power control indication field for beam 1 [dB] | Power control indication field for beam 2 [dB] |
|---|---|---|
| 0000 | −1 | −1 |
| 0001 | −1 | 0 |
| 0010 | −1 | 1 |
| 0011 | −1 | 3 |
| 0100 | 0 | −1 |
| 0101 | 0 | 0 |
| 0110 | 0 | 1 |
| 0111 | 0 | 3 |
| 1000 | 1 | −1 |
| 1001 | 1 | 0 |
| 1010 | 1 | 1 |
| 1011 | 1 | 3 |
| 1100 | 3 | −1 |
| 1101 | 3 | 0 |
| 1110 | 3 | 1 |
| 1111 | 3 | 3 |

For another example, the extended TPC command field is used to extend the original TPC indication value range. By taking the UE performing transmission by utilizing a beam corresponding to one spatial relation as an example, the number of the TPC field in the DCI is still 1, the number of occupied bits is increased from 2 bits to 4 bits, and the 4 bits in the extended TPC command field are all used to indicate a TPC indication value.

Table 3 shows a mapping relationship between the extended TPC command field and the extended power control indication value (the mapping relationship is not limited thereto). As shown in Table 3, the extended TPC command field occupies 4 bits, the 4 bits are all used to indicate a TPC indication value, and the range of the TPC indication value is extended from the original [−1,3] to [−8,7]. In table 3, the first to fourth rows are identical to those in Table 1, and the original TPC indication value remains unchanged; and, the fifth to sixteenth rows shows extended TPC indication values, and the indication range is extended and refined. When the power to be adjusted is high, for example, the base station needs to notify the UE to decrease the power by 3 dB, the power requirement can only be satisfied after multiple adjustments according to the original TPC command field. However, according to the extended TPC command field shown in Table 3, the DCI can directly satisfy the requirement through one TPC adjustment, so that the flexibility and adjustment efficient of power control are improved.

TABLE 3

Mapping relationship between the extended TPC command field and the extended power control indication value

| Extended TPC command field | Power control indication value for the first beam [dB] |
|---|---|
| 0000 | −1 |
| 0001 | 0 |
| 0010 | 1 |
| 0011 | 3 |
| 0100 | 2 |
| 0101 | 4 |
| 0110 | 5 |
| 0111 | 6 |
| 1000 | 7 |
| 1001 | −2 |
| 1010 | −3 |
| 1011 | −4 |
| 1100 | −5 |
| 1101 | −6 |
| 1110 | −7 |
| 1111 | −8 |

In the embodiment, the terminal device may select a PUCCH resource set from the configured resource sets according to the number of bits of the UCI to be transmitted, then determines a target resource for transmitting the UCI according to the PUCCH resource indicator field in the DCI, performs uplink transmission of the UCI by utilizing this target resource, and correspondingly adjusts the power of the transmission beam according to the extended TPC command field in the DCI.

In an embodiment, the method further includes a step S102.

At S102, the number of bits of the extended TPC command field in the DCI is semi-statically indicated through a first higher-layer parameter.

In the embodiment, the first higher-layer parameter (DCI-PayloadSize) semi-statically configures and notifies a payload size of the DCI to be received by the UE, to indicate the number of bits of the TPC command field in the DCI, so that the UE can extract corresponding transmission power control indication information from the received DCI. After the UE determines the number of bits of the TPC command field, it is still unable to determine whether these bits belong to one or more fields, and thus it is unable to determine whether these bits are used to indicate the TPC of one or more beams, so that a joint determination needs to be made according to the number of spatial relations included in the target resource indicated by the serving node and the indicated number of repetitions.

In an embodiment, the method further includes a step of S103.

At S103, the number of repetitions N of the PUCCH is configured through a second higher-layer parameter.

The reliability of data (or signaling) transmission can be improved by repetitions. M pieces of repeatedly transmitted data (or signaling) carry identical information, and M pieces of repeatedly transmitted data (or signaling) may come from M different TRPs or a same TRP. In the embodiment, the number of repetitions N is configured through a second higher-layer parameter (nrofslots) for allowing the UE to determine the number of transmissions of the PUCCH in the TPC command field.

In an embodiment, in a case where the target resource contains at least two spatial relations and the number of repetitions is equal to 1, the extended TPC command field in the DCI is used to extend the original TPC indication value range and adjust the uplink transmission power corresponding to the spatial relation used by the uplink transmission. In a case where the target resource corresponds to at least two spatial relations and the number of repetitions is greater than 1, the extended TPC command field is used to extend the number of TPC fields and adjust the uplink transmission power corresponding to spatial relations used by multiple uplink transmissions. In a case where the target resource corresponds to one spatial relation, no matter whether the number of repetitions is greater than 1, the extended TPC command field in the DCI is used to extend the original TPC indication value range and adjust the uplink transmission power corresponding to this spatial relation.

In the embodiment, in a case where the target resource contains a plurality of relation relations, the UE supports the use of a plurality of beams to transmit the UCI. In this case, it is also necessary to determine, according to the number of repetitions N configured by the second higher-layer parameter, whether the extended TPC command field is used to extend the original TPC indication value range or extend the number of TPC command fields, which specifically includes the following two situations.

1) If the number of repetitions N is 1, the UE only needs to transmit one uplink transmission on one slot, and the UE may select a first beam in the plurality of spatial relations corresponding to the target resource to transmit this uplink transmission. In this case, the extended TPC command field in the DCI is used to extend the original TPC indication value range, e.g., Table 3, and adjust the uplink transmission power corresponding to one of the spatial relations (e.g., the first beam).

2) If the number of repetitions N is greater than 1, the UE needs to repeatedly transmit an uplink transmission on N slots. In this case, the extended TPC command field is used to extend the number of TPC fields. For example, when the target resource contains two spatial relations, the DCI contains two TPC fields, the first 2 bits are used to indicate the TPC indication value corresponding to the beam 1 and the last 2 bits are used to indicate the TPC indication value corresponding to the beam 2.

In addition, when the target resource indicated by the DCI contains one spatial relation, no matter whether the number of repetitions N is greater than 1, the UE only supports the use of one beam to transmit the UCI. In this case, the TPC command field in the DCI is used to extend the original TPC indication value range, e.g., Table 3, and adjust the uplink transmission power of this spatial relation.

In an embodiment, the target resource includes a starting symbol position, a duration and a physical resource block index of PUCCH transmission, and the method further includes at least one of the followings:

for a PUCCH format 0, in the case that the target resource indicated by the DCI corresponds to at least two spatial relations, configuring initial cyclic shifts for different spatial relations in the target resource through a third higher-layer parameter, respectively;

for a PUCCH format 1, in the case that the target resource indicated by the DCI corresponds to at least two spatial relations, configuring initial cyclic shifts and orthogonal spreading codes for different spatial relations in the target resource through the third higher-layer parameter, respectively; and for a PUCCH format 2, 3 or 4, in the case that the target resource indicated by the DCI corresponds to at least two spatial relations, configuring scrambling sequence parameters for different spatial relations in the target resource through the third higher-layer parameter, respectively.

cal resource block index of the PUCCH, the higher-layer RCC signaling needs to additionally notify the index of the initial cyclic shift (AdditionalinitialCyclicShift) having a value range of 0 to 11, and the index of the orthogonal spreading code (Additionalinitial timeDomainOCC) having a value range of 0 to 6. Table 4 shows the orthogonal spreading code sequence in the PUCCH format 1.

TABLE 4

Orthogonal spreading code sequence in the PUCCH format 1

| Orthogonal spreading code sequence | φ | | | | | | |
|---|---|---|---|---|---|---|---|
| | i = 0 | i = 1 | i = 2 | i = 3 | i = 4 | i = 5 | i = 6 |
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

In the embodiment, the UE may transmit an uplink transmission to a plurality of TRPs by utilizing a plurality of beams. By taking two TRPs (TRP0 and TRP1) as an example, cells corresponding to the two TRPs may be different, and corresponding users may also be different. If different beams use the cyclic shift and scrambling sequence in the same target resource, interference with the user under another TRP will be caused, leading to reduced transmission performance. In the embodiment, in the process of indicating the target resource to the UE, in addition to the starting symbol position, duration and physical resource block index of the target resource, the serving node also indicates additional parameters for different PUCCH formats to distinguish transmission paths and beams for different TRPs, thereby avoiding the interference between different paths and improving the reliability of multi-TRP transmission.

1) For a PUCCH format 0, on a given physical time frequency resource, multi-user multiplexing may be performed by transmitting different cyclic shifts of the sequence. In the process of configuring the PUCCH resource for the UE, in addition to the starting symbol position, duration and physical resource block index of the PUCCH, the higher-layer radio resource control (RCC) signaling needs to additionally notify the index of the initial cyclic shift (AdditionalinitialCyclicShift), which has a value range of 0 to 11.

Figure 3:
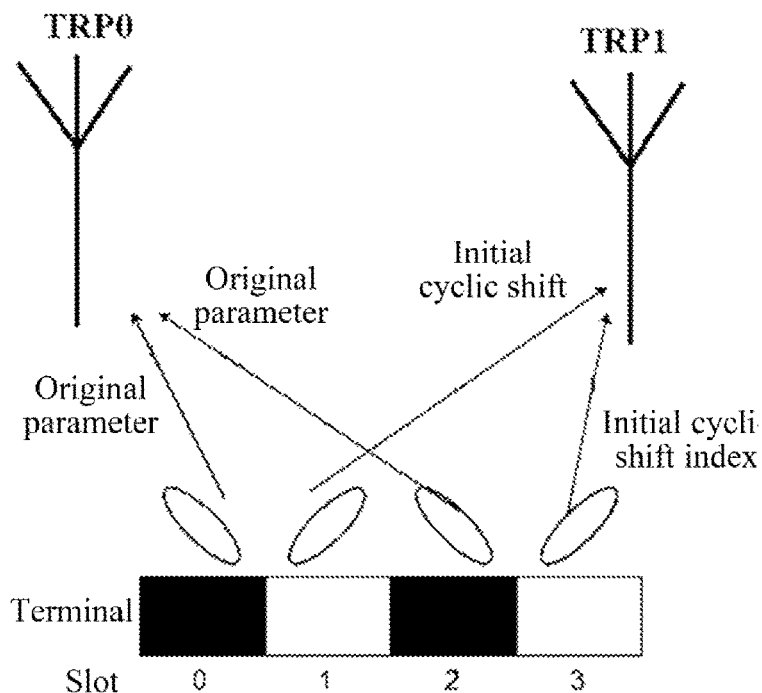
FIG. 3 is a schematic diagram of uplink transmissions and initial cyclic shift indexes according to an embodiment.

FIG. 3 is schematic diagram of uplink transmissions and initial cyclic shift indexes according to an embodiment. As shown in FIG. 3, in a case where the UE performs transmission in the PUCCH format 0 and the target resource indicated by the DCI contains two spatial relations, two different initialCyclicShift values indicated to the UE are associated with different TRPs. For example, the value indicated by an original parameter initialCyclicShift corresponds to the beam transmitted to the TRP0; and, the value indicated by an added parameter AdditionalinitialCyclicShift corresponds to the beam transmitted to the TRP1.

Figure 4:
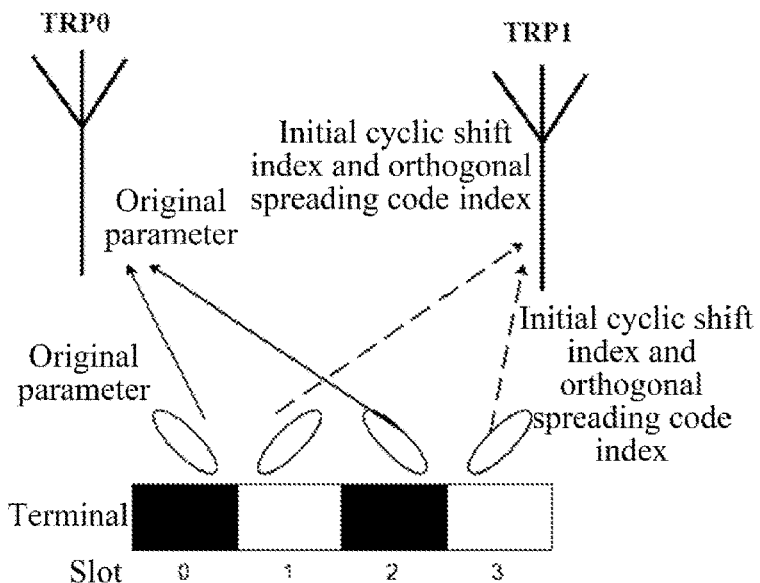
FIG. 4 is a schematic diagram of uplink transmissions, initial cyclic shift indexes and orthogonal spreading code indexes according to an embodiment.

2) For a PUCCH format 1, on a given physical time frequency resource, multi-user multiplexing may be performed by transmitting different cyclic shifts and time domain orthogonal spreading codes of the sequence. In the process of configuring the PUCCH resource for the UE, in addition to the starting symbol position, duration and physi- FIG. 4 is a schematic diagram of uplink transmissions, initial cyclic shift indexes and orthogonal spreading code indexes according to an embodiment. As shown in FIG. 4, in a case where the UE performs transmission in the PUCCH format 1 and the target resource indicated by the DCI contains two spatial relations, two different initialCyclicShift values and timeDomainOCC values indicated to the UE are associated with different TRPs. For the PUCCH format 1, the following method may be employed, but it is not limited thereto: the values indicated by the parameters initialCyclicShift and timeDomainOCC correspond to the beam transmitted to the TRP0; and, the value indicated by the parameters AdditionalinitialCyclicShift and AdditionaltimeDomainOCC correspond to the beam transmitted to the TRP1.

3) For a PUCCH format 2, 3 or 4, when transmission is performed in the PUCCH format 2, 3 or 4, the original information bit sequence is subjected to channel encoding, scrambling, discrete Fourier transformation (only in the PUCCH formats 3 and 4), modulation or other steps, and then mapped onto the resource block for transmission. The encoded bits are scrambled by the scrambling sequence, and the scrambling sequence is initialized according to a scrambling sequence parameter $n_{ID} \in \{0, 1, \ldots, 1023\}$, where $n_{ID}$ is configured by a higher-layer parameter (dataScramblingIdentityPUSCH).

Figure 5:
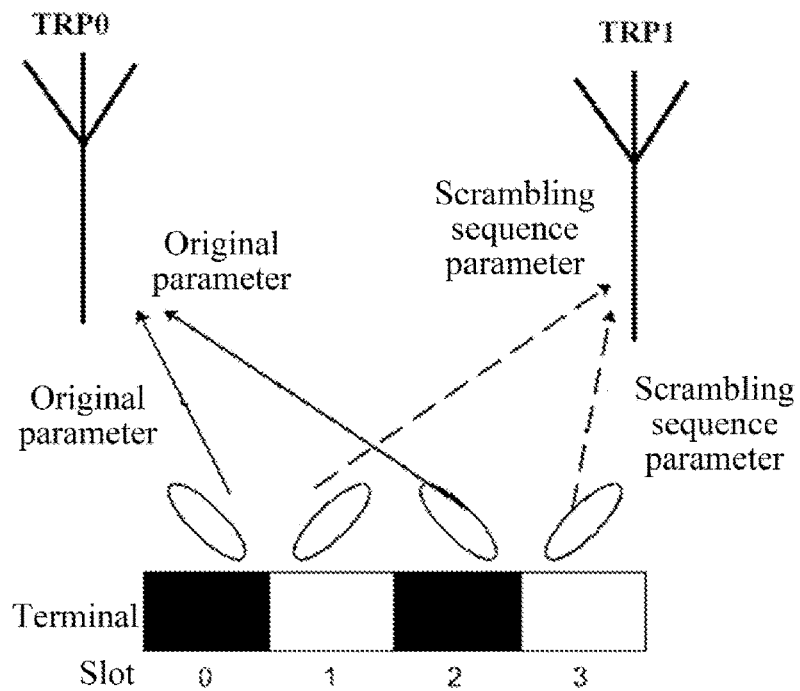
FIG. 5 is a schematic diagram of uplink transmissions and scrambling sequence parameters according to an embodiment.

FIG. 5 is a schematic diagram of uplink transmissions and scrambling sequence parameters according to an embodiment. As shown in FIG. 5, when a plurality of beams are configured for the PUCCH and transmission to Multi-TRPs is performed, a plurality of values should be indicated. For example, the value indicated by the original parameter dataScramblingIdentityPUSCH corresponds to the beam transmitted to the TRP0; and, the value indicated by the parameter AdditionaldataScramblingIdentity corresponds to the beam transmitted to the TRP1.

In an embodiment, in a case where the target resource corresponds to at least two spatial relations, the terminal device supports the use of one or more beams for uplink transmission; and, in a case where the target resource corresponds to one spatial relation, the terminal device supports the use of one beam for one uplink transmission.

In the embodiment, the UE supports the use of multiple beams to perform uplink transmission, so as to obtain a spatial grading gain. Which beam is specifically used for transmission or reception depends on the beam indication in the beam management. In a case where the serving node performs downlink transmission by analog beamforming, the serving node needs to indicate a serial number of the downlink analog transmission beam selected by the UE. Upon receiving the indication, the UE calls the best reception beam corresponding to the serial number for downlink reception according to the information stored in the beam training and pairing process. In a case where the serving mode schedules the UE to perform uplink transmission by analog beamforming, the serving node needs to indicate auxiliary information of an uplink analog transmission beam of the UE. Upon receiving the auxiliary information, the UE performs uplink transmission according to the uplink analog transmission beam indicated by the base station. The base station may call the reception beam corresponding to the transmission beam for uplink reception according to the information stored in the beam training and pairing process. For the uplink beam indication of the PUCCH, firstly, PUCCH radio resources are configured, and different PUCCH resources are semi-statically allocated to different transmission beam directions. By selecting the PUCCH radio resources, different transmission beam directions are selected to realize beam switching in multiple directions.

In an embodiment, the number of the target resource is 1, and the indication information is used to perform at least one of the followings:

in the case of the target resource indicated by the DCI corresponding to S spatial relations, S being greater than or equal to 2 and the number of repetitions N being greater than 1, indicating the terminal device to use L ($2 \leq L \leq S$) transmission beams to transmit N uplink transmissions on N slots, where the N uplink transmissions are identical in starting symbol and duration; in the case of the target resource indicated by the DCI corresponding to S spatial relations, S being greater than or equal to 2, and the number of repetitions N being equal to 1, indicating the terminal device to use L ($2 \leq L \leq S$) transmission beams to transmit L uplink transmissions on different frequency domains of a same slot, where the L uplink transmissions are identical in starting symbol and duration; in the case of the target resource indicated by the DCI corresponding to one spatial relation, and the number of repetitions N being greater than 1, indicating the terminal device to use a same transmission beam to transmit N uplink transmissions on N slots, where the N uplink transmissions are identical in starting symbol and duration; and, in the case of the target resource indicated by the DCI corresponding to one spatial relation, and the number of repetitions N being equal to 1, indicating the terminal device to use a same transmission beam to transmit one uplink transmission on a same slot.

In the embodiment, the serving node indicates to the terminal device the multiplexing mode of a target resource in the case of PUCCH Repetition, and supports the frequency division multiplexing (FDM) of the PUCCH, so as to obtain a frequency grading gain. Specifically, there are the following four situations.

Figure 6:
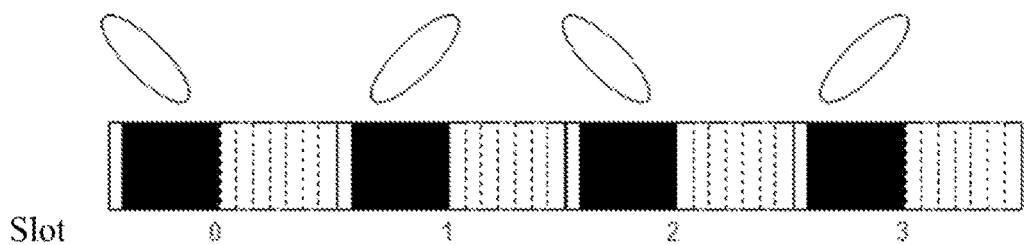
FIG. 6 is a schematic diagram of transmitting uplink transmissions on multiple slots by two beams according to an embodiment.

1) The target resource indicated by the DCI corresponds to a plurality of spatial relations, and the number of repetitions N is greater than 1. In this case, the UE is indicated to transmit a plurality of PUCCHs in a time division multiplexing (TDM) manner on different slots according to the number of repetitions indicated by the second higher-layer parameter, and to use a plurality of transmission beams. By taking the target resource containing two spatial relations as an example, FIG. 6 is a schematic diagram of transmitting uplink transmissions on multiple slots by two beams according to an embodiment. As shown in FIG. 6, the PUCCHs on different slots are identical in the starting symbol and duration.

Figure 7:
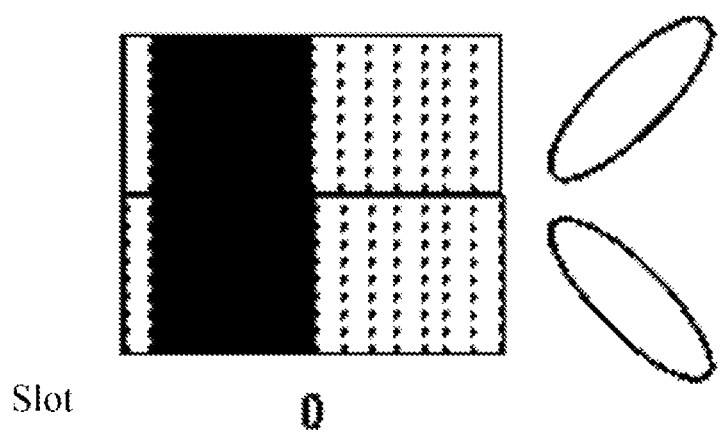
FIG. 7 is a schematic diagram of transmitting uplink transmissions on a same slot by two beams according to an embodiment.

2) The target resource indicated by the DCI corresponds to a plurality of spatial relations and the number of repetitions N is equal to 1. In this case, the UE transmits a plurality of PUCCHs (FDM) on a same slot according to the number of spatial relations corresponding to the PUCCH resource indicated by the DCI, and uses a plurality of transmission beams. By taking the target resource containing two spatial relations as an example, FIG. 7 is a schematic diagram of transmitting uplink transmissions on a same slot by two beams according to an embodiment. As shown in FIG. 7, each uplink transmission is identical in the starting symbol and duration.

Figure 8:
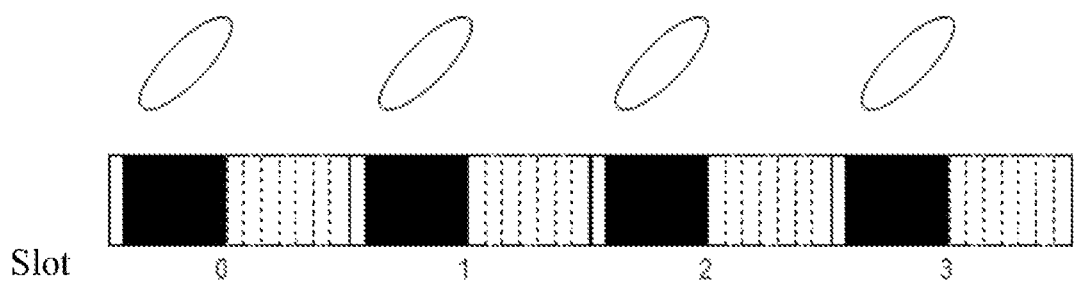
FIG. 8 is a schematic diagram of transmitting uplink transmissions on different slots by one beam according to an embodiment.

3) The target resource indicated by the DCI corresponds to one spatial relation, and the number of repetitions N is greater than 1. In this case, the UE is indicated to transmit a plurality of PUCCHs (TDM) on different slots according to the number of repetitions indicated by the second higher-layer parameter, and to use a same transmission beam. FIG. 8 is a schematic diagram of transmitting uplink transmissions on different slots by one beam according to an embodiment. As shown in FIG. 8, the PUCCHs on different slots are identical in the starting symbol and duration.

4) The target resource indicated by the DCI corresponds to one spatial relation, and the number of repetitions N is equal to 1. In this case, the UE is indicated to transmit one PUCCH on one slot according to the number of repetitions indicated by the second higher-layer parameter.

In an embodiment, the number of target resources is M, and M is greater than or equal to 2. The indication information is used to perform at least one of the followings:

in the case of each target resource containing one spatial relation, time domain symbols of the target resources being not overlapped and the number of repetitions N being equal to 1, indicating the terminal device to use L ($2 \leq L \leq M$) transmission beams to transmit L uplink transmissions on different symbols of a same slot; in the case of each target resource containing one spatial relation, time domain symbols of the target resources being overlapped and the number of repetitions N being equal to 1, indicating the terminal device to use L ($2 \leq L \leq M$) transmission beams to transmit L uplink transmissions on different frequency domains of a same slot; in the case of each target resource containing one spatial relation, time domain symbols of the target resources being not overlapped and the number of repetitions N being greater than 1, indicating the terminal device to use L ($2 \leq L \leq M$) transmission beams to transmit L uplink transmissions on different symbols of a same slot and perform N repetitions on N slots; in the case of each target resource containing one spatial relation, time domain symbols of the target resources being overlapped and the number of repetitions N being greater than 1, indicating the terminal device to use L ($2 \leq L \leq M$) transmission beams to transmit L uplink transmissions on different frequency domains of a same slot and perform N repetitions on N slots; and, in the case of each target resource containing one spatial relation and the number of repetitions N being greater than 1, no matter whether time domain symbols of the target resources are overlapped or not, indicating the terminal device to use L (2≤L≤M) transmission beams to perform N repetitions on N slots, where the N uplink transmissions are identical or different in starting symbol and duration.

In the embodiment, the serving node indicates to the terminal device the multiplexing mode of a plurality of target resources in the case of PUCCH Repetition, and supports the FDM of the PUCCH, so as to obtain a frequency grading gain. By taking the number of target resources being 2 as an example, specifically, there may be the following five situations.

Figure 9:
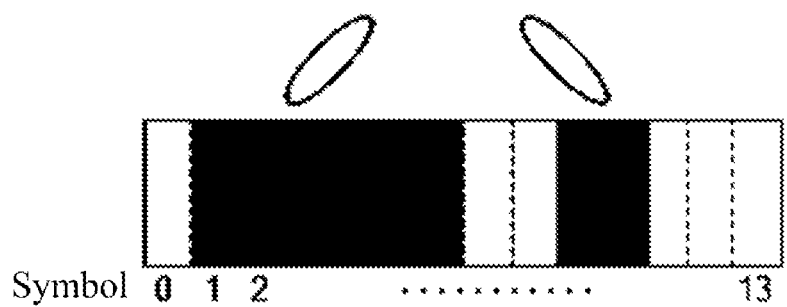
FIG. 9 is a schematic diagram of transmitting uplink transmissions on different symbols of a same slot according to an embodiment.

1) Each of the two target resources indicated by the DCI contains one spatial relation, the time domain symbols of the target resources are not overlapped, and the number of repetitions N is equal to 1. In this case, the UE is indicated to use two transmission beams to transmit two uplink transmissions on different symbols of a same slot. FIG. 9 is a schematic diagram of transmitting uplink transmissions on different symbols of a same slot according to an embodiment. As shown in FIG. 9, intra-slot time division multiplexing is supported.

Figure 10:
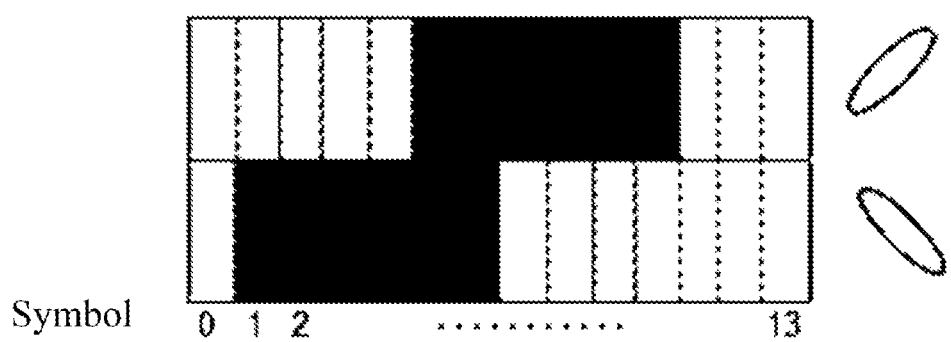
FIG. 10 is a schematic diagram of transmitting uplink transmissions on different frequency domains of a same slot according to an embodiment.

2) Each of the two target resources indicated by the DCI contains one spatial relation, the time domain symbols of the target resources are overlapped, and the number of repetitions N is equal to 1. In this case, the UE is indicated to use two transmission beams to transmit two uplink transmissions on different frequency domains of a same slot. FIG. 10 is a schematic diagram of transmitting uplink transmissions on different frequency domains of a same slot according to an embodiment. As shown in FIG. 10, frequency division multiplexing is supported.

Figure 11:
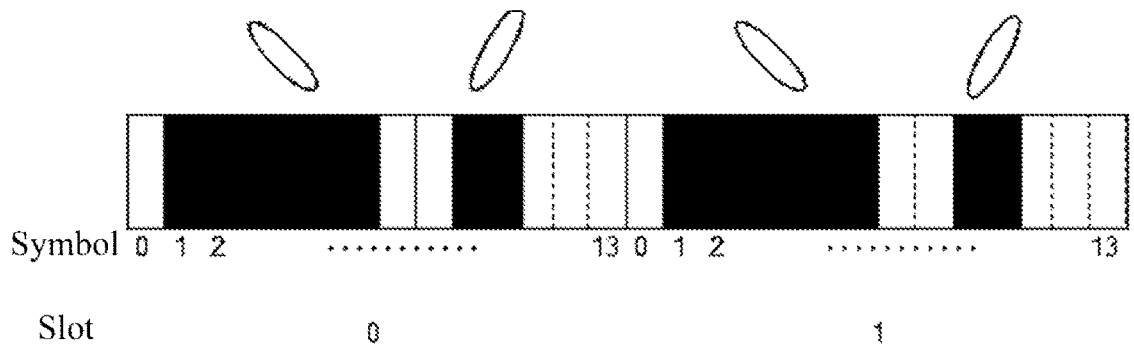
FIG. 11 is a schematic diagram of transmitting uplink transmissions on different symbols of multiple slots according to an embodiment.

3) Each of the two target resources indicated by the DCI contains one spatial relation, the time domain symbols of the target resources are not overlapped, and the number of repetitions N is greater than 1. In this case, the UE is indicated to use two transmission beams to transmit two uplink transmissions on different symbols of a same slot and perform N repetitions on N slots. FIG. 11 is a schematic diagram of transmitting uplink transmissions on different symbols of multiple slots according to an embodiment.

Figure 12:
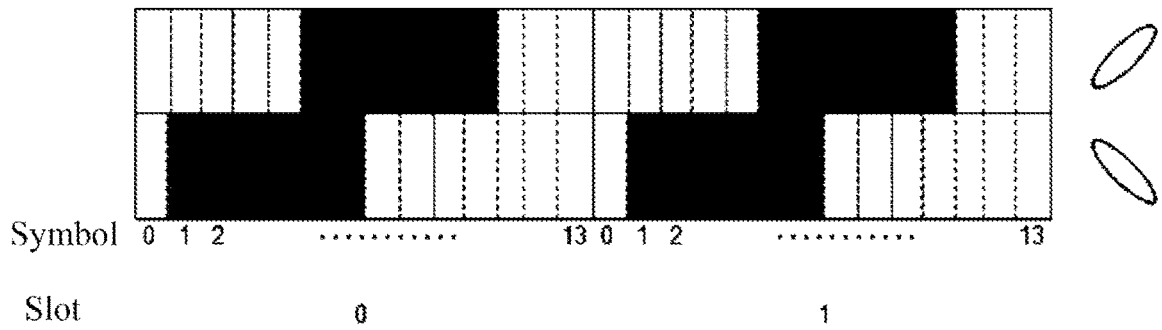
FIG. 12 is a schematic diagram of transmitting uplink transmissions on different frequency domains of multiple slots according to an embodiment.

4) Each of the two target resources indicated by the DCI contains one spatial relation, the time domain symbols of the target resources are overlapped, and the number of repetitions N is greater than 1. In this case, the UE is indicated to use two transmission beams to transmit two uplink transmissions on different frequency domains of a same slot and perform N repetitions on N slots. FIG. 12 is a schematic diagram of transmitting uplink transmissions on different frequency domains of multiple slots according to an embodiment. As shown in FIG. 12, frequency division multiplexing is supported.

Figure 13:
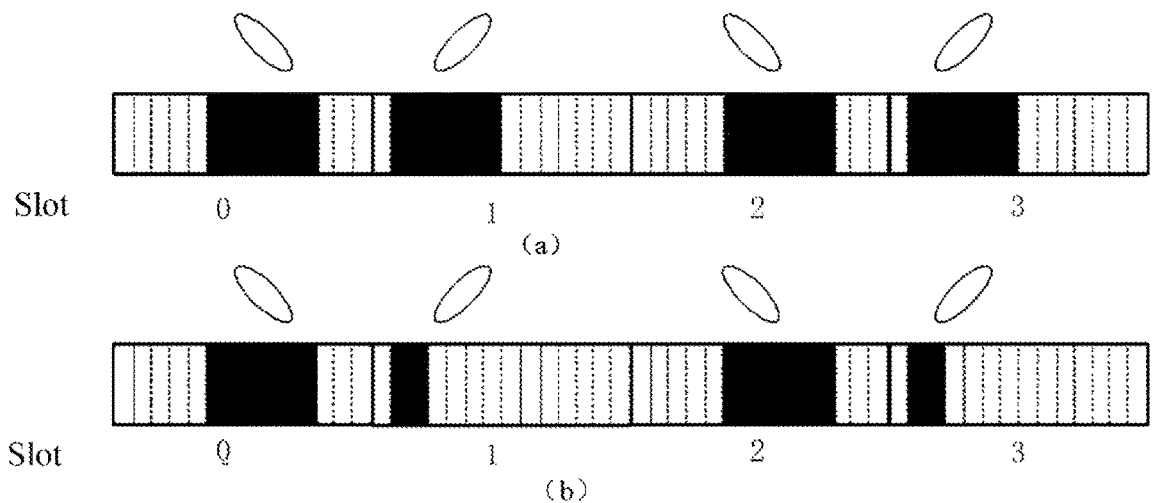
FIG. 13 is a schematic diagram of transmitting uplink transmissions on different frequency domains of multiple slots according to another embodiment.

5) Each of the two target resources contains one spatial relation, and the number of repetitions N is greater than 1. In this case, no matter whether the time domain symbols of the target resources are overlapped or not, the UE is indicated to use two transmission beams to perform N repetitions on N slots, where the N uplink transmissions are identical or different in the starting symbol and duration. FIG. 13 is a schematic diagram of transmitting uplink transmissions on different frequency domains of multiple slots according to another embodiment, where (a) shows a situation where the time domain symbols of the target resources are overlapped, and (b) shows a situation where the time domain symbols of the target resources are not overlapped.

The indication method in the above embodiment is intended to improve the reliability of uplink transmission in Multi-TRP or Multi-panel. Firstly, in the case of configuring multiple beams, the problem of power mismatching of other beams when the serving node has only one power adjustment factor is solved. When multiple beams are different in performance, for example, when another transmission beam is enabled to avoid congestion, if only one TPC is notified by the DCI at this time, only one of the transmission beams may be matched, so that the other transmission beam is not matched. In the above embodiment, the method of determining power parameters of other beams is taken into consideration in this case, and the TPC commend field in the DCI is extended.

Secondly, the payload size of the DCI is semi-statically indicated through the first higher-layer parameter, and the number of repetitions and the target resource (containing one or more spatial relations) are indicated. Thus, the number of bits of each piece of control information in the DCI is defined, and it is jointly determined whether the extended TPC command field is used to extend the number of TPC command fields or extend the original TPC indication value range, providing a reliable basis for the power control of uplink transmission of the UE.

In addition, in a case where the UE is indicated to use multiple beams to transmit uplink transmissions, different beams may be transmitted to two TRPs, respectively. By adding corresponding indication parameters to multiple beams, the interference between TRPs caused by using the cyclic shift and scrambling sequence in the same target resource by different beams is avoided, and the transmission performance and reliability are improved.

Finally, the FDM and intra-slot TDM in the case of PUCCH repetition are supported, so that the uplink transmission is allowed to obtain a frequency grading gain.

An embodiment of the present disclosure further provides an uplink transmission method, which is applied to a terminal device. The terminal device determines a resource configuration for uplink transmission by receiving indication information, and then transmits uplink transmission on this basis, so that the flexibility and reliability of uplink transmission are provided. It is to be noted that the specific operations executed by the terminal device in this embodiment correspond to the specific operations executed by the serving node in the above embodiments, and the technical details that are not described in detail in this embodiment may refer to any one of the above embodiments.

Figure 14:
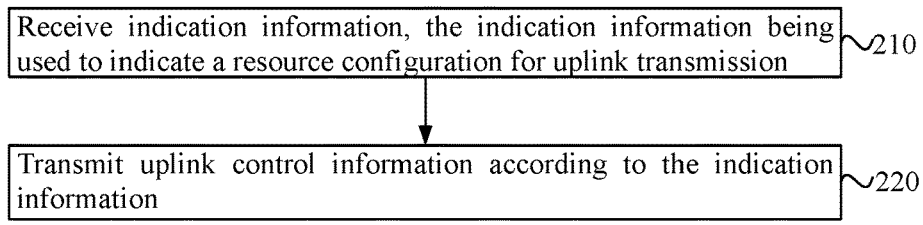
FIG. 14 is a flowchart of an uplink transmission method according to an embodiment.

FIG. 14 is a flowchart of an uplink transmission method according to an embodiment. As shown in FIG. 14, the method provided in this embodiment includes steps S210 and S220.

At S210, indication information is received, where the indication information is used to indicate a resource configuration for uplink transmission.

At S220, uplink control information (UCI) is transmitted according to the indication information.

In the embodiment, the serving node is, for example, a base station and the terminal device is, for example, a user equipment (UE). The resource configuration may include a resource set available for the terminal device, a resource for transmitting uplink transmission, a spatial relation included in the resource, the number of repetitions of the PUCCH, a transmission mode for uplink transmission, etc., and is used to indicate the resource used by the terminal device to transmit uplink transmission and a specific transmission mode. The UCI is an uplink transmission signaling transmitted to the serving node by the terminal device. The terminal device may transmit the UCI to a plurality of TRPs (e.g., a plurality of base stations), and the serving node indicates to the terminal device a plurality of resource configurations, which correspond to paths between the terminal device and the plurality of TRPs, respectively.

In an embodiment, the terminal device is configured with at least one PUCCH resource set, each PUCCH resource set contains at least one uplink transmission resource and each uplink transmission resource corresponds to at least one spatial relation.

In an embodiment, the indication information includes DCI. A PUCCH resource indicator field in the DCI is used to indicate a target resource, the target resource is an uplink transmission resource used by the terminal device to transmit the UCI, and the target resource contains at least one spatial relation.

In an embodiment, the indication information includes DCI. An extended TPC command field in the DCI is used to adjust the uplink transmission power of the terminal device to transmit the UCI. The extended TPC command field is used to extend an original TPC indication value range or extend the number of TPC fields. The function of the extended TPC command field is determined according to the number of spatial relations included in the target resource and the number of repetitions of the PUCCH.

In the embodiment, the terminal device may determine a PUCCH resource set from the configured resource sets according to the number of bits of the UCI to be transmitted, then determines a target resource for transmitting the UCI according to the PUCCH resource indicator field in the DCI, performs uplink transmission of the UCI by utilizing this target resource, and correspondingly adjusts the power of the transmission beam according to the extended TPC command field in the DCI. The extended TCP command field is used to extend the original TPC indication value range or extend the number of TPC command fields, and the terminal device jointly determines the function of the extended TPC command field according to the number of spatial relations included in the target resource and the number of repetitions.

In an embodiment, the method further includes a step S201.

At S201, a first higher-layer parameter is received, and the number of bits of the extended TPC command field in the DCI is determined according to the first higher-layer parameter.

In the embodiment, the first higher-layer parameter (DCI-PayloadSize) semi-statically configures and notifies a payload size of the DCI to be received by the UE, so as to indicate the number of bits of the TPC command field in the DCI, so that the UE can extract corresponding transmission power control indication information from the received DCI. After the UE determines the number of bits of the TPC command field, it is still unable to determine whether these bits belong to one or more fields, and it is also unable to determine whether these bits are used to indicate the TPC of one or more beams, so that a joint determination needs to be made according to the number of spatial relations included in the target resource indicated by the serving node and the indicated number of repetitions.

In an embodiment, the method further includes a step S202.

At S202, a second higher-layer parameter is received, and the number of repetitions N of the uplink transmission is determined according to the second higher-layer parameter.

In an embodiment, in the case of the target resource containing at least two spatial relations and the number of repetitions being equal to 1, the extended TPC command field in the DCI is used to extend the original TPC indication value range and adjust the uplink transmission power corresponding to the spatial relation used by an uplink transmission;

in the case of the target resource corresponding to at least two spatial relations and the number of repetitions being greater than 1, the extended TPC command field is used to extend the number of TPC fields and adjust the uplink transmission power corresponding to spatial relations used by multiple uplink transmissions; and in the case of the target resource corresponding to one spatial relation, the extended TPC command field in the DCI is used to extend the original TPC indication value range and adjust the uplink transmission power corresponding to the spatial relation.

In the embodiment, firstly in a case where the target source contains a plurality of relation relations, the UE supports the use of a plurality of beams to transmit the UCI. In this case, it is also necessary to determine, according to the number of repetitions N configured by the second higher-layer parameter, whether the extended TPC command field is used to extend the original TPC indication value range or extend the number of TPC command fields.

In an embodiment, the method further includes a step S211.

At S211, a starting symbol position, a duration and a physical resource block index of the target resource are determined according to the PUCCH resource indicator field in the DCI.

The spatial relation satisfies at least one of the followings:
for a PUCCH format 0, in the case of the target resource indicated by the DCI corresponding to at least two spatial relations, configuring different initial cyclic shifts for different spatial relations in the target resource;

for a PUCCH format 1, in the case of the target resource indicated by the DCI corresponding to at least two spatial relations, configuring different initial cyclic shifts and orthogonal spreading codes for different spatial relations in the target resource; and for a PUCCH format 2, 3 or 4, in the case of the target resource indicated by the DCI corresponding to at least two spatial relations, configuring different scrambling sequences for different spatial relations in the target resource.

In the embodiment, the UE may transmit an uplink transmission to a plurality of TRPs by utilizing a plurality of beams. By taking two TRPs (TRP0 and TRP1) as an example, cells corresponding to the two TRPs may be different, and corresponding users may also be different. If different beams use the cyclic shift and scrambling sequence in the same target resource, the interference with the user under another TRP will be caused, leading to reduced transmission performance. In the embodiment, in the process of indicating the target resource to the UE, in addition to the starting symbol position, duration and physical resource block index of the target resource, the serving node also indicates additional parameters for different PUCCH formats to distinguish transmission paths and beams for different TRPs, so that the UE performs uplink transmission on this basis, thereby avoiding the interference between different paths and improving the reliability of multi-TRP transmission.

In an embodiment, in a case where the target resource corresponds to at least two spatial relations, the terminal device supports the use of one or more beams for uplink transmissions.

In a case where the target resource corresponds to one spatial relation, the terminal device supports the use of one beam for uplink transmission.

In an embodiment, the number of the target resource is 1; and

S220 includes at least one of the followings:

in the case of the target resource indicated by the DCI corresponding to S spatial relations, S being greater than or equal to 2 and the number of repetitions N being greater than 1, using L transmission beams to transmit N uplink transmissions on N slots, where the N uplink transmissions are identical in starting symbol and duration;

in the case of the target resource indicated by the DCI corresponding to S spatial relations, S being greater than or equal to 2 and the number of repetitions N being equal to 1, using L (2≤L≤S) transmission beams to transmit L uplink transmissions on different frequency domains of a same slot, where the L uplink transmissions are identical in starting symbol and duration;

in the case of the target resource indicated by the DCI corresponding to one spatial relation and the number of repetitions N being greater than 1, using a same transmission beam to transmit N uplink transmissions on N slots, where the N uplink transmissions are identical in starting symbol and duration; and in the case of the target resource indicated by the DCI corresponding to one spatial relation and the number of repetitions N being equal to 1, using a same transmission beam to transmit one uplink transmission on a same slot.

In the embodiment, the serving node indicates to the terminal device the multiplexing mode of a target resource in the case of PUCCH Repetition, and supports the FDM of the PUCCH, so as to obtain a frequency grading gain.

In an embodiment, the number of target resources is M, and M is greater than or equal to 2; and S220 includes at least one of the followings:

in the case of each target resource containing one spatial relation, time domain symbols of the target resources being not overlapped and the number of repetitions N being equal to 1, using L (2≤L≤S) transmission beams to transmit L uplink transmissions on different symbols of a same slot;

in the case of each target resource containing one spatial relation, time domain symbols of the target resources being overlapped and the number of repetitions N being equal to 1, using L (2≤L≤S) transmission beams to transmit L uplink transmissions on different frequency domains of a same slot;

in the case of each target resource containing one spatial relation, time domain symbols of the target resources being not overlapped and the number of repetitions N being greater than 1, using L (2≤L≤S) transmission beams to transmit L uplink transmissions on different symbols of a same slot and perform N repetitions on N slots;

in the case of each target resource containing one spatial relation, time domain symbols of the target resources being overlapped and the number of repetitions N being greater than 1, using L (2≤L≤S) transmission beams to transmit L uplink transmissions on different frequency domains of a same slot and perform N repetitions on N slots; and in the case of each target resource containing one spatial relation and the number of repetitions N being greater than 1, no matter whether time domain symbols of the target resources are overlapped or not, using L (2≤L≤S) transmission beams to perform N repetitions on N slots, where the N uplink transmissions are identical or different in starting symbol and duration.

In the embodiment, the serving node indicates to the terminal device the multiplexing mode of a plurality of target resources in the case of PUCCH Repetition, and supports the FDM of the PUCCH, so as to obtain a frequency grading gain.

The uplink transmission method in the above embodiment is intended to improve the reliability of uplink transmission in Multi-TRP or Multi-panel. Firstly, in the case of configuring multiple beams, the TPC field in the DCI is extended, and the terminal device acquires the extended TPC command field by receiving the indication information. Secondly, the terminal device determines the payload size of the DCI according to the first higher-layer parameter received, defines the number of bits of each piece of control information in the DCI according to the number of repetitions and the target resource (containing one or more spatial relations), jointly determines whether the extended TPC command field is used to extend the number of TPC command fields or extend the original TPC indication value range, and transmits the uplink transmission on this basis, thereby improving the reliability of uplink transmission. In addition, in a case where the terminal device is indicated to use multiple beams to transmit uplink transmissions, different beams may be transmitted to two TRPs, respectively. For different beams, the uplink transmission is transmitted according to the added indication parameter, so that the interference between TRPs caused by using the cyclic shift and scrambling sequence in the same target resource by different beams is avoided, and the transmission performance and reliability are improved. Finally, the FDM and intra-slot TDM in the case of PUCCH repetition are supported, so that the uplink transmission is allowed to obtain a frequency grading gain.

Figure 15:
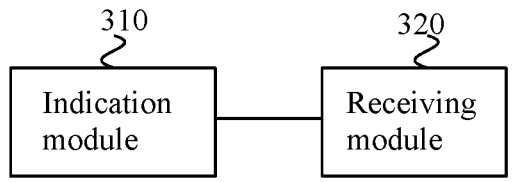
FIG. 15 is a schematic structural diagram of an indication apparatus according to an embodiment.

An embodiment of the present disclosure further provides an indication apparatus. FIG. 15 is a schematic structural diagram of an indication apparatus according to an embodiment. As shown in FIG. 15, the indication apparatus includes an indication module 310 and a receiving module 320.

The indication module 310 is configured to transmit indication information, the indication information is used to indicate a resource configuration for uplink transmission.

The receiving module 320 is configured to receive UCI transmitted by a terminal device.

In the indication apparatus provided in the embodiment, a serving node indicates to a terminal device a resource configuration for transmitting uplink transmission by transmitting the indication information, thereby providing a basis for the terminal device to transmit UCI by utilizing the corresponding resource, and ensuring the reliability of uplink transmission.

In an embodiment, the indication apparatus further includes: a configuration module and an activation module.

The configuration module is configured to configure at least one PUCCH resource set for the terminal device through a higher-layer signaling, each PUCCH resource set containing at least one PUCCH resource.

The activation module is configured to activate at least one spatial relation for each uplink transmission resource of the terminal device through an MAC-CE.

In an embodiment, the indication information includes DCI.

A PUCCH indicator field in the DCI is used to indicate a target source, the target resource is an uplink transmission resource used by the terminal device to transmit the UCI, and the target resource contains at least one spatial relation.

In an embodiment, the indication information includes DCI.

An extended TPC command field in the DCI is used to adjust the uplink transmission power of the terminal device to transmit the UCI.

The extended TPC command field is used to extend an original TPC indication value range or extend the number of TPC fields.

The function of the extended TPC command field is determined according to the number of spatial relations included in the target resource and the number of repetitions of a PUCCH.

In an embodiment, the indication apparatus further includes:
a number-of-bits indication module configured to semi-statically indicate the number of bits of the extended TPC command field in the DCI through a first higher-layer parameter.

In an embodiment, the indication apparatus further includes:
a number-of-repetitions configuration module configured to configure the number of repetitions N of the PUCCH through a second higher-layer parameter.

In an embodiment, in the case of the target resource containing at least two spatial relations and the number of repetitions being equal to 1, the extended TPC command field in the DCI is used to extend the original TPC indication value range and adjust the uplink transmission power corresponding to the spatial relation used by an uplink transmission.

In the case of the target resource corresponding to at least two spatial relations and the number of repetitions being greater than 1, the extended TPC command field is used to extend the number of TPC fields and adjust the uplink transmission power corresponding to spatial relations used by multiple uplink transmissions.

In the case of the target resource corresponding to one spatial relation, the extended TPC command field is used to the original TPC indication value range and adjust the uplink transmission power corresponding to the spatial relation.

In an embodiment, the target resource includes a starting symbol position, a duration and a physical resource block index of PUCCH transmission.

The apparatus further includes a parameter configuration module configured to execute at least one of the followings:
for a PUCCH format 0, in the case of the target resource indicated by the DCI corresponding to at least two spatial relations, configuring initial cyclic shifts for different spatial relations in the target resource through a third higher-layer parameter, respectively;
for a PUCCH format 1, in the case of the target resource indicated by the DCI corresponding to at least two spatial relations, configuring initial cyclic shifts and orthogonal spreading codes for different spatial relations in the target resource through the third higher-layer parameter, respectively; and
for a PUCCH format 2, 3 or 4, in the case of the target resource indicated by the DCI corresponding to at least two spatial relations, configuring a scrambling sequence parameter for different spatial relations in the target resource through the third higher-layer parameter, respectively.

In an embodiment, in the case of the target resource corresponding to at least two spatial relations, the terminal device supports the use of one or more beams for uplink transmission.

In the case of the target resource corresponding to one spatial relation, the terminal device supports the use of one beam for uplink transmission.

In an embodiment, the number of the target resource is 1. The indication module 310 is configured to execute at least one of the followings:
in the case of the target resource indicated by the DCI corresponding to a plurality of spatial relations and the number of repetitions N being greater than 1, indicating the terminal device to use a plurality of transmission beams to transmit N uplink transmissions on N slots, where the N uplink transmissions are identical in starting symbol and duration;
in the case of the target resource indicated by the DCI corresponding to a plurality of spatial relations and the number of repetitions N being equal to 1, indicating the terminal device to use a plurality of transmission beams to transmit multiple uplink transmissions on different frequency domains of a same slot, where the uplink transmissions are identical in starting symbol and duration;
in the case of the target resource indicated by the DCI corresponding to one spatial relation and the number of repetitions N being greater than 1, indicating the terminal device to use a same transmission beam to transmit N uplink transmissions on N slots, where the N uplink transmissions are identical in starting symbol and duration; and
in the case of the target resource indicated by the DCI corresponding to one spatial relation and the number of repetitions N being equal to 1, indicating the terminal device to use a same transmission beam to transmit one uplink transmission on a same slot.

In an embodiment, the number of target resources is M, and M is greater than or equal to 2.

The indication module 310 is configured to execute at least one of the followings:
in the case of each target resource containing one spatial relation, time domain symbols of the target resources being not overlapped and the number of repetitions N being equal to 1, indicating the terminal device to use at least two transmission beams to transmit at least two uplink transmissions on different symbols of a same slot;
in the case of each target resource containing one spatial relation, time domain symbols of the target resources being overlapped and the number of repetitions N being equal to 1, indicating the terminal device to use at least two transmission beams to transmit at least two uplink transmissions on different frequency domains of a same slot;
in the case of each target resource containing one spatial relation, time domain symbols of the target resources being not overlapped and the number of repetitions N being greater than 1, indicating the terminal device to use a plurality of transmission beams to transmit M uplink transmissions on different symbols of a same slot and perform N repetitions on N slots; and
in the case of each target resource containing one spatial relation, time domain symbols of the target resources being overlapped and the number of repetitions N being greater than 1, indicating the terminal device to use a plurality of transmission beams to transmit M uplink transmissions on different frequency domains of a same slot and perform N repetitions on N slots.

The indication apparatus provided in this embodiment belongs to the same concept as the indication method described in the above embodiments. The technical details that are not described in detail in this embodiment may refer to the above embodiments, and this embodiment has the same beneficial effects as executing the indication method.

Figure 16:
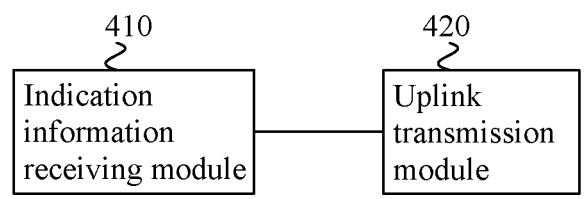
FIG. 16 is a schematic structural diagram of an uplink transmission apparatus according to an embodiment.

An embodiment of the present disclosure further provides an uplink transmission apparatus. FIG. 16 is a schematic structural diagram of an uplink transmission apparatus according to an embodiment. As shown in FIG. 16, the uplink transmission apparatus includes an indication information receiving module 410 and an uplink transmission module 420.

The indication information receiving module 410 is configured to receive indication information, the indication information being used to indicate a resource configuration for uplink transmission.

The uplink transmission module 420 is configured to transmit UCI according to the indication information.

In the indication apparatus provided in the embodiment, the terminal device determines a resource configuration for uplink transmission by receiving indication information, and then transmits uplink transmission on this basis, thus providing the flexibility and reliability of uplink transmission.

In an embodiment, the terminal device is configured with at least one PUCCH resource set, and each PUCCH resource set contains at least one uplink transmission resource.

Each uplink transmission resource corresponds to at least one spatial relation.

In an embodiment, the indication information includes DCI.

A PUCCH indicator field in the DCI is used to indicate a target source, the target resource is an uplink transmission resource used by the terminal device to transmit the UCI, and the target resource contains at least one spatial relation.

In an embodiment, the indication information includes DCI.

An extended TPC command field in the DCI is used to adjust the uplink transmission power of the terminal device to transmit the UCI.

The extended TPC command field is used to extend the original TPC indication value range or extend the number of TPC fields.

The function of the extended TPC command field is determined according to the number of spatial relations included in the target resource and the number of repetitions of a PUCCH.

In an embodiment, the uplink transmission apparatus further includes:
a number-of-bits determination module configured to receive a first higher-layer parameter and determine the number of bits of the extended TPC command field in the DCI according to the first higher-layer parameter.

In an embodiment, the uplink transmission apparatus further includes:
a number-of-repetition determination module configured to receive a second higher-layer parameter and determine the number of repetitions N of the uplink transmission according to the second higher-layer parameter.

In an embodiment, in the case of the target resource containing at least two spatial relations and the number of repetitions being equal to 1, the extended TPC command field in the DCI is used to extend the original TPC indication value range and adjust the uplink transmission power corresponding to the spatial relation used by an uplink transmission.

In the case of the target resource corresponding to at least two spatial relations and the number of repetitions being greater than 1, the extended TPC command field is used to extend the number of TPC fields and adjust the uplink transmission power corresponding to spatial relations used by multiple uplink transmissions.

In the case of the target resource corresponding to one spatial relation, the extended TPC command field in the DCI is used to the original TPC indication value range and adjust the uplink transmission power corresponding to the spatial relation.

In an embodiment, the uplink transmission apparatus further includes:
an index determination module configured to determine the starting symbol position, duration and physical resource block index of the target resource according to the PUCCH resource indicator field in the DCI; and The spatial relation satisfies at least one of the followings:
for a PUCCH format 0, in the case of the target resource indicated by the DCI corresponding to at least two spatial relations, configuring different initial cyclic shifts for different spatial relations in the target resource;
for a PUCCH format 1, in the case of the target resource indicated by the DCI corresponding to at least two spatial relations, configuring different initial cyclic shifts and orthogonal spreading codes for different spatial relations in the target resource; and
for a PUCCH format 2, 3 or 4, in the case of the target resource indicated by the DCI corresponding to at least two spatial relations, configuring different scrambling sequence parameters for different spatial relations in the target resource.

In an embodiment, in the case of the target resource corresponding to at least two spatial relations, the terminal device supports the use of one or more uplink beam for transmission.

In the case of the target resource corresponding to one spatial relation, the terminal device supports the use of one beam for uplink transmission.

In an embodiment, the number of the target resource is 1.

The uplink transmission module 420 is configured to execute at least one of the followings:
in the case of the target resource indicated by the DCI corresponding to S spatial relations, S being greater than or equal to 2 and the number of repetitions N being greater than 1, using L ($2 \leq L \leq S$) transmission beams to transmit N uplink transmissions on N slots, where the N uplink transmissions are identical in starting symbol and duration;
in the case of the target resource indicated by the DCI corresponding to S spatial relations, S being greater than or equal to 2 and the number of repetitions N being equal to 1, using L transmission beams to transmit L uplink transmissions on different frequency domains of a same slot, where the L uplink transmissions are identical in starting symbol and duration;
in the case of the target resource indicated by the DCI corresponding to one spatial relation and the number of repetitions N being greater than 1, using a same transmission beam to transmit N uplink transmissions on N slots, where the N uplink transmissions are identical in starting symbol and duration; and in the case of the target resource indicated by the DCI corresponding to one spatial relation and the number of repetitions N being equal to 1, using a same transmission beam to transmit one uplink transmission on a same slot.

In an embodiment, the number of target resources is M, and M is greater than or equal to 2.

The uplink transmission module 420 is configured to execute at least one of the following:

in the case of each target resource containing one spatial relation, time domain symbols of the target resources being not overlapped and the number of repetitions N being equal to 1, using L (2≤L≤M) transmission beams to transmit L uplink transmissions on different symbols of a same slot;

in the case of each target resource containing one spatial relation, time domain symbols of the target resources being overlapped and the number of repetitions N being equal to 1, using L transmission beams to transmit L uplink transmissions on different frequency domains of a same slot;

in the case of each target resource containing one spatial relation, time domain symbols of the target resources being not overlapped and the number of repetitions N being greater than 1, using L transmission beams to transmit L uplink transmissions on different symbols of a same slot and perform N repetitions on N slots;

in the case of each target resource containing one spatial relation, time domain symbols of the target resources being overlapped and the number of repetitions N being greater than 1, using L transmission beams to transmit L uplink transmissions on different frequency domains of a same slot and perform N repetitions on N slots; and in the case of each target resource containing one spatial relation and the number of repetitions N being greater than 1, no matter whether time domain symbols of the target resources are overlapped or not, using L transmission beams to perform N repetitions on N slots, where the N uplink transmissions are identical or different in starting symbol and duration.

The uplink transmission apparatus provided in this embodiment belongs to the same concept as the uplink transmission method described in the above embodiments. The technical details that are not described in detail in this embodiment may refer to the above embodiments, and this embodiment has the same beneficial effects as executing the uplink transmission method.

An embodiment of the present disclosure further provides a serving node. The indication method may be executed by an indication apparatus, and the indication apparatus may be implemented by software and/or hardware and integrated in the serving node. For example, the serving node is a base station.

Figure 17:
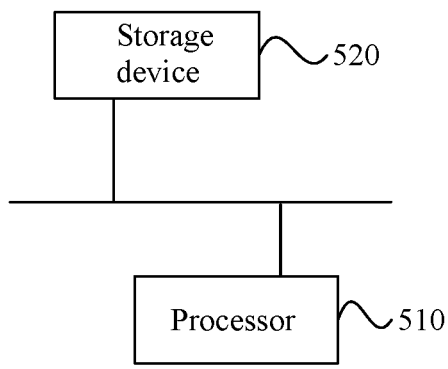
FIG. 17 is a hardware structure diagram of a serving node according to an embodiment.

FIG. 17 is a hardware structural diagram of a serving node according to an embodiment. As shown in FIG. 17, the serving node provided in this embodiment includes a processor 510 and a storage device 520. There may be one or more processors 510 in the serving node, and FIG. 17 is illustrated by taking one processor 510 as an example. The processor 510 and the storage device 520 in the serving node may be connected via a bus or in other ways, and FIG. 17 is illustrated by taking the processor and the storage device being connected via a bus as an example.

The one or more programs, when executed by the one or more processors 510, cause the one or more processors to implement the indication method according to any one of the above embodiments.

As a computer-readable storage medium, the storage device 520 in the serving node may be configured to store one or more programs. The programs may be software programs, computer-executable programs and modules, for example, program instructions/modules corresponding to the indication method in the embodiments of the present invention (for example, the modules in the indication apparatus shown in FIG. 15, including the indication module 310 and the receiving module 320). The software programs, instructions and modules stored in the storage device 520, when executed by the processor 510, cause the processor 510 to execute various functional applications and data processing of the serving node, so as to implement the indication method in the above method embodiments.

The storage device 520 mainly includes a program storage region and a data storage region. The program storage region may store application programs required by an operating system and at least one function. The data storage region may store data created according to the use of the device, etc. (e.g., the indication information, the UCI, etc., in the above embodiments). In addition, the storage device 520 may include high-speed random-access memories, or may include non-volatile memories, for example, at least one magnetic disk memory device, flash memory devices or other non-volatile solid-state memory devices. In some instances, the storage device 520 may include memories remotely arranged relative to the processor 510, and these remote memories may be connected to the serving node via a network. Examples of the network include, but not limited to, Internet, Intranet, local area networks, mobile communication networks and combinations thereof.

In addition, when the one or more programs included in the serving node is executed by the one or more processors 510, the following operations are implemented: transmitting indication information, the indication information being used to indicate a resource configuration for uplink transmission; and, receiving UCI transmitted by a terminal device.

The serving node provided in this embodiment belongs to the same concept as the indication method described in the above embodiments. The technical details that are not described in detail in this embodiment may refer to the above embodiments, and this embodiment has the same beneficial effects as executing the indication method.

An embodiment of the present disclosure further provides a terminal device. The uplink transmission method may be executed by an uplink transmission apparatus, and the uplink transmission apparatus may be implemented by software and/or hardware and integrated in the terminal device. For example, the terminal device is a user equipment.

Figure 18:
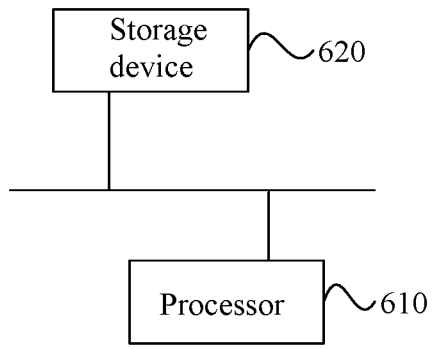
FIG. 18 is a hardware structure diagram of a terminal device according to an embodiment.

FIG. 18 is a hardware structural diagram of a terminal device according to an embodiment. As shown in FIG. 18, the terminal device provided in the embodiment includes a processor 610 and a storage device 620. There may be one or more processors 610 in the terminal device, and FIG. 18 is illustrated by taking one processor 610 as an example. The processor 610 and the storage device 620 in the terminal device may be connected via a bus or in other ways, and FIG. 18 is illustrated by taking the processor and the storage device being connected via a bus as an example.

The one or more programs, when executed by the one or more processors 610, cause the one or more processors 510 to implement the uplink transmission method according to any one of the above embodiments.

As a computer-readable storage medium, the storage device 620 in the terminal device may be configured to store one or more programs. The programs may be software programs, computer-executable programs and modules, for example, program instructions/modules corresponding to the uplink transmission method in the embodiments of the present invention (for example, the modules in the uplink transmission apparatus shown in FIG. 16, including the indication information receiving module 410 and the uplink transmission module 420). By running the software programs, instructions and modules stored in the storage device 620, the processor 610 executes various functional applications and data processing of the terminal device, so as to implement the uplink transmission method in the above method embodiments.

The storage device 620 mainly includes a program storage region and a data storage region. The program storage region may store application programs required by the operating system and at least one function. The data storage region may store data created according to the use of the device, etc. (e.g., the uplink transmission information, the UCI, etc., in the above embodiments). In addition, the storage device 620 may include high-speed random-access memories, or may include non-volatile memories, for example, at least one magnetic disk memory device, flash memory devices or other non-volatile solid-state memory devices. In some instances, the storage device 620 may further include memories remotely arranged relative to the processor 610, and these remote memories may be connected to the terminal device via a network. Examples of the network include, but not limited to, Internet, Intranet, local area networks, mobile communication networks and combinations thereof.

In addition, when the one or more programs included in the terminal device is executed by the one or more processors 610, the following operations are implemented: receiving uplink transmission information, the uplink transmission information being used to uplink transmit a resource configuration for uplink transmission; and, transmitting UCI according to the uplink transmission information.

The terminal device provided in this embodiment belongs to the same concept as the uplink transmission method described in the above embodiments. The technical details that are not described in detail in this embodiment may refer to the above embodiments, and this embodiment has the same beneficial effects as executing the uplink transmission method.

An embodiment of the present disclosure further provides a storage medium containing computer-executable instructions which, when executed by a computer processor, cause the computer processor to implement an indication method or an uplink transmission method.

The indication method includes steps of: transmitting indication information, the indicating information being used to indicate a resource configuration for uplink transmission; and, receiving UCI transmitted by a terminal device.

The uplink transmission method includes steps of: receiving indication information, the indication information being used to indicate a resource configuration for uplink transmission; and, transmitting UCI according to the indication information.

From the above description of the implementations, it should be understood by those having ordinary skill in the art that the present disclosure may be implemented by means of software and general-purpose hardware or may be implemented by means of hardware. Based on this understanding, the technical schemes of the present disclosure may be embodied in the form of a software product. The computer software product may be stored in a computer-readable storage medium, for example, floppy disks, read-only memories (ROMs), random access memories (RAMs), flash memories (FLASH), hard disks, optical disks or the like of computers, and includes a plurality of instructions configured to cause a computer device (which may be a personal computer, a server, a network device, etc.) to execute the method according to any one of the embodiments of the present disclosure.

The foregoing description merely shows the example embodiments of the present disclosure, and is not intended to limit the protection scope of the present disclosure.

The blocks of any logic flow in the accompanying drawings of the present disclosure may represent program steps, or may represent interconnected logic circuits, modules and functions, or may represent combinations of program steps and logic circuits, modules or functions. The computer programs may be stored on a memory. The memory may be of any type suitable for the local technical environment and may be implemented by any suitable data storage technology, for example, but not limited to, read only memories (ROMs), random access memories (RAMs), optical memory devices and systems (digital versatile disks (DVDs) or CDs), etc. The computer-readable medium may include non-transient storage mediums. The data processor may be of any type suitable for the local technical environment, for example, but not limited to, general purpose computers, special purpose computers, microprocessors, digital signal processors (DSPs), application specific integrated circuits (ASICs), programmable logic devices (FGPAs), and processors based on a multi-core processor architecture.

What is claimed is:

1. An indication method, applicable to a serving node, comprising:
 transmitting indication information configured to indicate a resource configuration for uplink transmission; and
 receiving uplink control information transmitted by a terminal device;
 wherein the method further comprises:
 configuring at least one physical uplink control channel (PUCCH) resource set for the terminal device through a higher-layer signaling, each PUCCH resource set comprising at least one PUCCH resource; and
 activating at least one spatial relation for each PUCCH resource of the terminal device through a medium access control-control element (MAC-CE).

2. The method of claim 1, wherein the indication information comprises downlink control information (DCI); and
 the DCI comprises a PUCCH indicator field used to indicate a target resource, the target resource is a PUCCH resource used by the terminal device to transmit the uplink control information, and the target resource comprises at least one spatial relation.

3. The method of claim 2, further comprising:
 semi-statically indicating the number of bits of the extended TPC command field in the DCI through a first higher-layer parameter.

4. The method of claim 2, further comprising:
 configuring the number of repetitions N of the PUCCH through a second higher-layer parameter.

5. The method of claim 2, wherein,
 the target resource comprises a starting symbol position, a duration and a physical resource block index of PUCCH transmission; and
 the method further comprises at least one of:
 for a PUCCH format 0, in response to the target resource indicated by the DCI corresponding to at least two spatial relations, configuring initial cyclic shifts for different spatial relations in the target resource through a third higher-layer parameter, respectively;
for a PUCCH format 1, in response to the target resource indicated by the DCI corresponding to at least two spatial relations, configuring initial cyclic shifts and orthogonal spreading codes for different spatial relations in the target resource through the third higher-layer parameter, respectively; and
for a PUCCH format 2, 3 or 4, in response to the target resource indicated by the DCI corresponding to at least two spatial relations, configuring scrambling sequence parameters for different spatial relations in the target resource through the third higher-layer parameter, respectively.

6. The method of claim 2, wherein,
in response to the target resource corresponding to at least two spatial relations, the terminal device supports the use of at least one beam for uplink transmission; and
in response to the target resource corresponding to one spatial relation, the terminal device supports the use of one beam for uplink transmission.

7. The method of claim 2, wherein the number of the target resource is 1; and
the indication information is used to indicate at least one of:
in response to the target resource indicated by the DCI corresponding to S spatial relations, S being greater than or equal to 2 and the number of repetitions N being greater than 1, indicating the terminal device to use L (2≤L≤S) transmission beams to transmit N uplink transmissions on N slots, the N uplink transmissions being identical in starting symbol and duration;
in response to the target resource indicated by the DCI corresponding to S spatial relations, S being greater than or equal to 2 and the number of repetitions N being equal to 1, indicating the terminal device to use L (2≤L≤S) transmission beams to transmit L uplink transmissions in different frequency domains of the same slot, the L uplink transmissions being identical in starting symbol and duration;
in response to the target resource indicated by the DCI corresponding to one spatial relation and the number of repetitions N being greater than 1, indicating the terminal device to use a same transmission beam to transmit N uplink transmissions on N slots, the N uplink transmissions being identical in starting symbol and duration; and
in response to the target resource indicated by the DCI corresponding to one spatial relation and the number of repetitions N being equal to 1, indicating the terminal device to use a same transmission beam to transmit one uplink transmission on a same slot.

8. The method of claim 2, wherein the number of target resources is M, and M is greater than or equal to 2; and
the indication information is used to indicate at least one of:
in response to each target resource comprising one spatial relation, time domain symbols of the plurality of target resources being not overlapped and the number of repetitions N being equal to 1, indicating the terminal device to use L (2≤L≤M) transmission beams to transmit L uplink transmissions on different symbols of the same slot;
in response to each target resource comprising one spatial relation, time domain symbols of the plurality of target resources being overlapped and the number of repetitions N being equal to 1, indicating the terminal device to use L (2≤L≤M) transmission beams to transmit L uplink transmissions on different frequency domains of the same slot;
in response to each target resource comprising one spatial relation, time domain symbols of the plurality of target resources being not overlapped and the number of repetitions N being greater than 1, indicating the terminal device to use L (2≤L≤M) transmission beams to transmit L uplink transmissions on different symbols of the same slot and perform N repetitions on N slots;
in response to each target resource comprising one spatial relation, time domain symbols of the plurality of target resources being overlapped and the number of repetitions N being greater than 1, indicating the terminal device to use L (2≤L≤M) transmission beams to transmit L uplink transmissions on different frequency domains of the same slot and perform N repetitions on N slots; and
in response to each target resource comprising one spatial relation and the number of repetitions N being greater than 1, no matter whether time domain symbols of the plurality of target resources are overlapped or not, indicating the terminal device to use L (2≤L≤M) transmission beams to perform N repetitions on N slots, the N repetitions being identical or different in starting symbol and duration.

9. The method of claim 1, wherein the indication information comprises DCI; and
the DCI comprises an extended transmission power control (TPC) command field used to adjust an uplink transmission power of the terminal device to transmit the uplink control information;
the extended TPC command field is used to extend an original TPC indication value range or extend the number of TPC fields; and
a function of the extended TPC command field is determined according to the number of spatial relations included in the target resource and the number of repetitions of a PUCCH.

10. The method of claim 9, wherein,
in response to the target resource comprising at least two spatial relations and the number of repetitions being equal to 1, the extended TPC command field is used to extend the original TPC indication value range and adjust the uplink transmission power corresponding to the spatial relation used by the uplink transmission;
in response to the target resource corresponding to at least two spatial relations and the number of repetitions being greater than 1, the extended TPC command field is used to extend the number of TPC fields and adjust the uplink transmission power corresponding to spatial relations used by multiple uplink transmissions; and
in response to the target resource corresponding to one spatial relation, the extended TPC command field is used to the original TPC indication value range and adjust the uplink transmission power corresponding to the spatial relation.

11. A serving node, comprising:
one or more processors; and
a storage device, configured to store one or more programs;

wherein the one or more programs, when executed by the one or more processors, cause the one or more processors to carry out the indication method of claim 1.

12. A non-transitory computer-readable storage medium storing computer programs which, when executed by a processor, cause the processor to carry out the indication method of claim 1.

13. An uplink transmission method, applied to a terminal device, comprising:
receiving indication information used to indicate a resource configuration for uplink transmission; and
transmitting uplink control information according to the indication information;
wherein at least one physical uplink control channel (PUCCH) resource set is configured for the terminal device through a higher-layer signaling, and each PUCCH resource set comprises at least one PUCCH resource; and
at least one spatial relation is activated for each PUCCH resource of the terminal device through a medium access control-control element (MAC-CE).

14. The method of claim 13, wherein the indication information comprises downlink control information (DCI); and
the DCI comprises a PUCCH resource indicator field used to indicate a target resource, the target resource is an uplink transmission resource used by the terminal device to transmit the uplink control information, and the target resource comprises at least one spatial relation.

15. The method of claim 14, further comprising:
receiving a first higher-layer parameter and determining the number of bits of the extended TPC command field in the DCI according to the first higher-layer parameter.

16. The method of claim 13, wherein the indication information comprises DCI;
the DCI comprises an extended transmission power control (TPC) command field used to adjust the uplink transmission power of the terminal device to transmit the uplink control information;
the extended TPC command field is used to extend an original TPC indication value range or extend the number of TPC fields; and
a function of the extended TPC command field is determined according to the number of spatial relations included in the target resource and the number of repetitions of a PUCCH.

17. A terminal device, comprising:
one or more processors; and
a storage device, configured to store one or more programs;
wherein the one or more programs, when executed by the one or more processors, cause the one or more processors to carry out the uplink transmission method of claim 13.

18. A non-transitory computer-readable storage medium storing computer programs which, when executed by a processor, cause the processor to carry out the indication method of claim 13.

* * * * *